(No Model.) 2 Sheets—Sheet 2.
J. T. PHILLIPS.
RAILROAD SIGNAL.
No. 377,908. Patented Feb. 14, 1888.
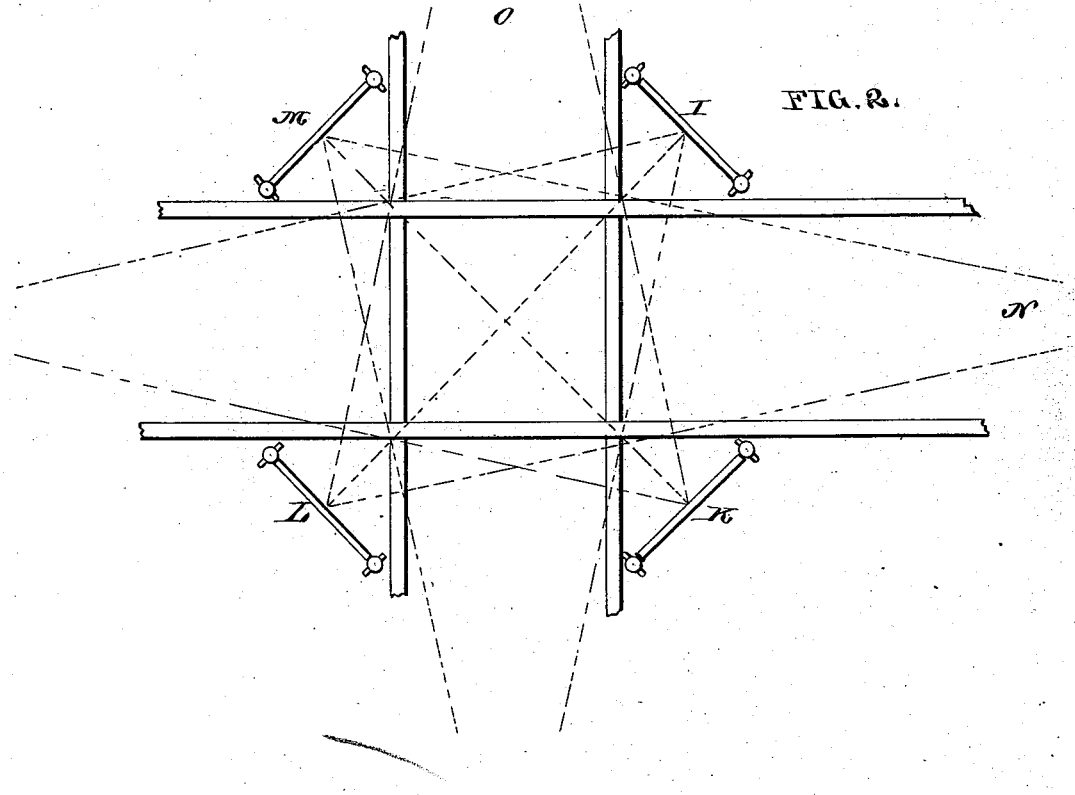
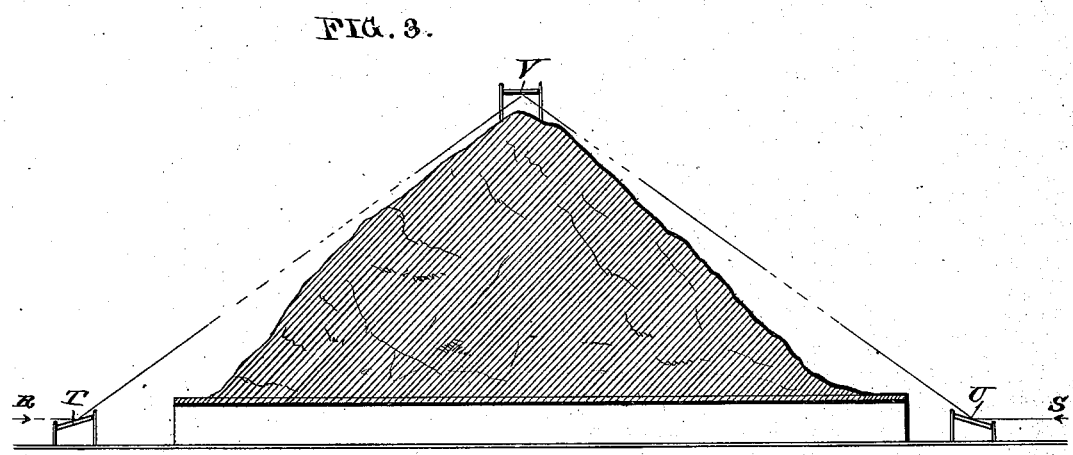
Witnesses
Jos. A. Ryan
C. E. Doyle
Inventor
John T. Phillips.
by C. A. Snow & Co.,
his Attorneys

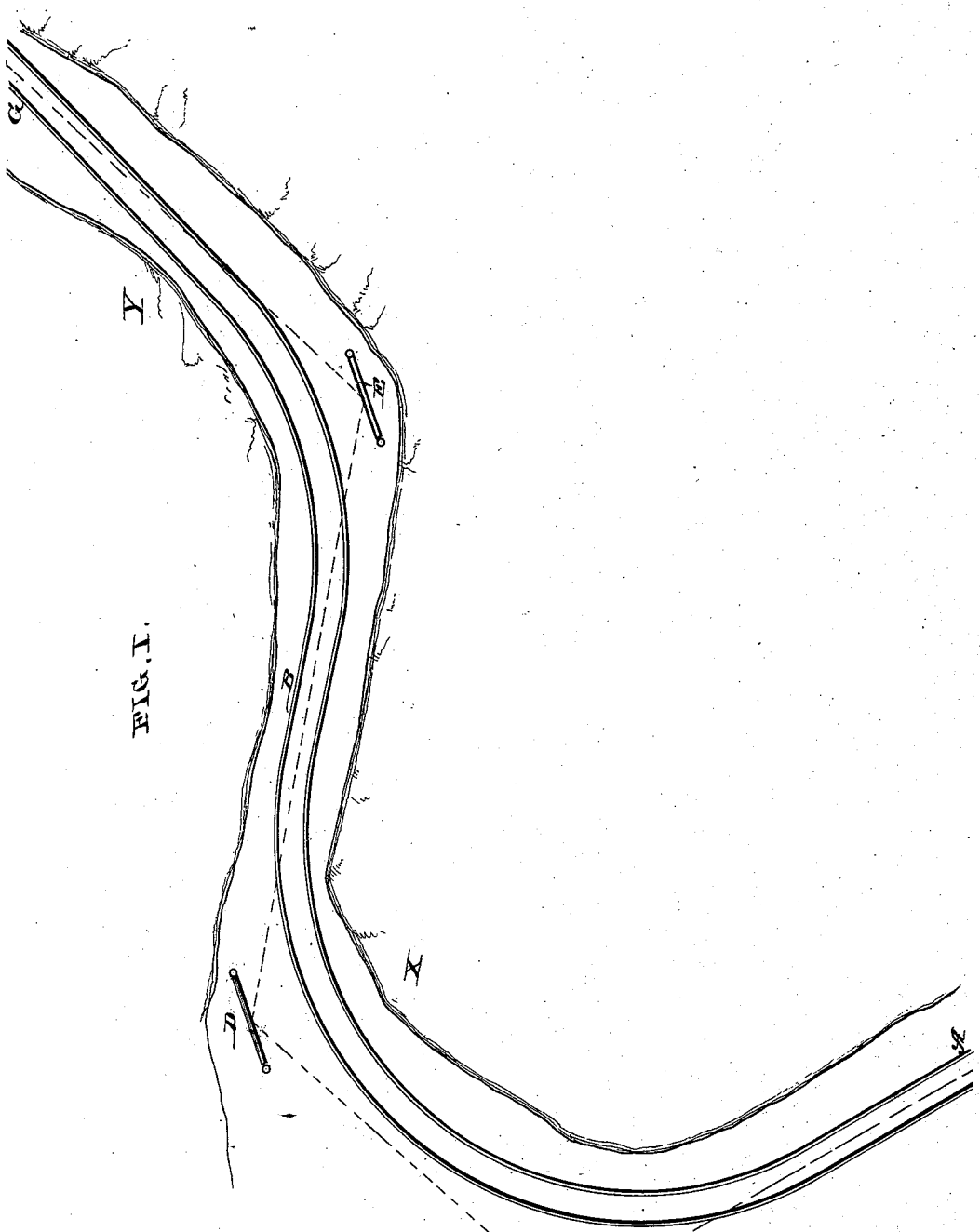

UNITED STATES PATENT OFFICE.

JOHN T. PHILLIPS, OF NEW CASTLE, PENNSYLVANIA.

RAILROAD-SIGNAL.

SPECIFICATION forming part of Letters Patent No. 377,908, dated February 14, 1888.

Application filed August 15, 1887. Serial No. 246,984. (No model.)

*To all whom it may concern:*

Be it known that I, JOHN T. PHILLIPS, a citizen of the United States, residing at New Castle, in the county of Lawrence and State of Pennsylvania, have invented new and useful Improvements in Railroad-Signals, of which the following is a specification.

My invention relates to improvements in railroad-signals; and it consists in a certain novel construction and arrangement, hereinafter fully described, and specifically pointed out in the claims.

The object of the invention is to provide means whereby an engineer may see an obstruction or a train on the track at the other end of a curve in the road or in a tunnel and a long distance off, to enable him to slow or stop his engine, and thus avoid a collision. I accomplish this object by placing mirrors at certain points around the curve, so that the rays of light from the obstruction or approaching engine will be inflected around the curve to the engineer. By equivalent means I can also inflect the rays of light from a head-light or other object over the top of a hill, so as to give the engineer on the opposite side warning of danger ahead where the cut through the hill is too narrow to arrange mirrors therein.

In the accompanying drawings I illustrate the different positions in which the mirrors may be placed to accomplish the proper inflection of the light.

Figure 1 is a plan view of a section of a railroad, showing a curve supposed to be around the base of a hill, which hill comes close to the concave side of the curve, and also showing the arrangement of three mirrors so as to inflect the rays of light around the base of the hill. Fig. 2 is a view showing the manner of signaling the approach of trains at railroad-crossings. Fig. 3 shows the manner of inflecting rays of light over a hill-top.

Referring to the drawings, in Fig. 1 it will be seen that an engineer at A cannot see around the curve sufficiently to discover the approach of an engine at B, and therefore there is liability of a collision. To avoid this, I place a mirror at the point C on the opposite side of the track from the hill, (or on the outer side of the curve,) and still farther around the curve another mirror, D, which is placed in such a relative position to the first mirror that the rays of light from the head-light of the engine at B will strike the mirror D, will be inflected into the mirror C, and then will be again inflected to the point A, which point the engineer must pass in coming along the track. It will be understood that this point A is not merely a single spot, as the mirror C is so arranged that the rays reflected therefrom from the direction of the mirror D will shine a considerable distance down the track from the point A, and thus the engineer will have ample opportunity to see the signal and stop his engine.

In Fig. 1 the hill around which the track is supposed to be laid is at X, and thus a single curve is formed; but in many localities the course of the track is very winding, and at Y, I will suppose there is another embankment or hill around which the track passes, and it is desirable (perhaps on account of the shortness of the first curve) to inflect the rays of light from the point G at the beginning of the second curve. To accomplish this, I place a mirror, E, in such a position as to catch the rays of light from the head-light of an engine at G, inflect them into the mirror at D, which in turn will inflect them into the mirror at C, which last mirror will throw them down the track in the path of an approaching engine. In this way the approach of an engine may be discovered at a distance of miles and around any number of curves, the mirrors being arranged at a height to receive the rays of light from the head-light fairly. In day-time, when no head-light is used, the reflection of the engine or of some bright or conspicuous object on the engine must be the signal.

It will be obvious that the principle involved in this mode of signaling is that a ray of light, striking the surface of a mirror at an angle less than a right angle thereto from one side, will be reflected therefrom at an equal angle on the opposite side. Thus, by placing the mirrors so that a straight line drawn from any point, as A, on the straight portion of the track will touch the mirror C about the center, and a straight line drawn from that point in the opposite direction and at an equal angle to the surface of the mirror will touch the mirror D about the center, and a third line drawn from the center of the mirror D at an angle equal to the angle at which the second line approaches the said mirror will pass down the straight portion of the track, as at B, the light will be inflected properly. This principle will hold good where the track is on an incline, as in climbing a hill, the same as on level tracts.

Fig. 2 shows the manner of signaling at crossings, and it will be seen that the mirrors are suspended above the track by any suitable frame-work, as by posts at the sides of the track. The principle involved here is the same as that before stated. If the tracks are at right angles to each other, the mirrors are placed at angles of forty-five degrees to both of the intersecting tracks, and consequently an object approaching along either track will be seen by the engineer on the other track. For instance, suppose two railroads intersect each other at the point H at right or other angles to each other. Four mirrors, I K L M, are arranged as described, and it will be seen that an engineer at N will be able to see a train approaching the intersection from either the right or left and avoid a collision, and also an engineer at O can see the approach of a train from either his right or left. This arrangement of signals at crossings is designed more especially for points where carriage-roads cross the railroad, to enable the drivers of the carriages to see the approach of a train at a distance, and thus avoid driving up close to the track at the risk of the horse becoming frightened. At night, especially, is this of advantage, as a driver may know of the approach of a train while yet at a considerable distance by the reflection of the head-light, and thus many accidents may be avoided.

Fig. 3 illustrates the manner of signaling over a hill-top. Suppose two trains to be approaching opposite sides of the hill from the points R S. I place a mirror at the bottom of the hill on each side, as seen at T U, and one at the top of the hill, as seen at V, all of said mirrors being arranged horizontally instead of vertically, as in the former cases. The mirrors T U are inclined slightly from the horizontal to enable them to throw rays of light received from the points R and S, respectively, into the mirror V at the top of the hill and at equal angles, and thus it will be seen that the rays from the head-light of an engine at R will be inflected by the mirror at T into the mirror at V, from thence to the mirror at U on the opposite side of the hill, and from thence to the engineer at S. Thus two engines approaching each other, and while yet on opposite sides of the hill, may be warned of each others presence, and a collision can therefore be avoided.

It will be understood that if the hill is long or very high or uneven more than three mirrors may be employed; but the principle is herein shown.

Obviously light reflected in one direction through a series of mirrors will be correspondingly reflected in the opposite direction.

Referring again to Fig. 1, if a head-light at G will be seen at A by the inflection through a series of mirrors, it is evident that a head-light at A will also be seen at G, and thus signaling in both directions is accomplished by one set of means.

In Fig. 3 the mirrors T and U are disposed with their faces up and the mirror V is disposed with its face down, as it will be seen that it is necessary to so arrange them in order to properly reflect the rays of light.

Having thus described my invention, I claim—

1. As an improvement in railroad-signals, a series of mirrors each of which is fixedly supported at an angle to the line of the track, substantially as and for the purpose set forth.

2. As an improvement in railroad-signals, a series of fixed mirrors supported at angles to the line of the track and also at angles to each other, as set forth.

3. As an improvement in railroad-signals, a series of fixed mirrors each of which is supported at an angle to each of the intersecting tracks, as set forth.

In testimony that I claim the foregoing as my own I have hereto affixed my signature in presence of two witnesses.

JOHN T. PHILLIPS.

Witnesses:
HIRAM G. MILLER,
FANNIE M. PHILLIPS.